United States Patent
Boni et al.

(10) Patent No.: US 6,642,499 B1
(45) Date of Patent: Nov. 4, 2003

(54) SYSTEM FOR PHOTOMETRIC CALIBRATION OF OPTOELECTRONIC IMAGING DEVICES ESPECIALLY STREAK CAMERAS

(75) Inventors: Robert Boni, LeRoy, NY (US); Paul Jaanimagi, Fairport, NY (US)

(73) Assignee: The University of Rochester, Rochester, NY (US)

( * ) Notice: Subject to any disclaimer, the term of this patent is extended or adjusted under 35 U.S.C. 154(b) by 0 days.

(21) Appl. No.: 09/356,932

(22) Filed: Jul. 19, 1999

(51) Int. Cl.[7] ............................................... H01J 40/14
(52) U.S. Cl. ............................ 250/214 VT; 250/214 R; 313/103 R
(58) Field of Search .................. 250/214 VT, 214.1, 250/214 R; 313/104, 103 R, 103 CM, 529, 537

(56) References Cited

U.S. PATENT DOCUMENTS

| | | | |
|---|---|---|---|
| 3,949,162 A | | 4/1976 | Malueg |
| 3,973,117 A | * | 8/1976 | Bradley ..................... 250/199 |
| 4,212,061 A | | 7/1980 | Knoll et al. |
| 4,266,247 A | | 5/1981 | Sutphin et al. |
| 4,298,944 A | | 11/1981 | Stoub et al. |
| 4,323,977 A | | 4/1982 | Arseneau |
| 4,386,404 A | | 5/1983 | Knoll et al. |
| 4,396,943 A | | 8/1983 | Lord et al. |
| 4,435,727 A | | 3/1984 | Schiller et al. |

(List continued on next page.)

OTHER PUBLICATIONS

D.S. Montgomery, R.P. Drake, B.A. Jones, & J.D. Wiedwald, Flat–field response and geometric distrtion measurements of optical streak cameras, High Speed Photography, Videography, and Photonics V, SPIE vol. 832, pp. 283–288, 1987.

(List continued on next page.)

Primary Examiner—Zandra V. Smith
(74) Attorney, Agent, or Firm—Kenneth J. Lukacher; Martin Lukacher

(57) ABSTRACT

A system for the photometric calibration of streak cameras and similar imaging devices provides a precise knowledge of the camera's flat-field response as well as a mapping of the geometric distortions. The system provides the flat-field response, representing the spatial variations in the sensitivity of the recorded output, with a signal-to-noise ratio (SNR) greater than can be achieved in a single submicrosecond streak record. The measurement of the flat-field response is carried out by illuminating the input slit of the streak camera with a signal that is uniform in space and constant in time. This signal is generated by passing a continuous wave source through an optical homogenizer made up of a light pipe or pipes in which the illumination typically makes several bounces before exiting as a spatially uniform source field. The rectangular cross-section of the homogenizer is matched to the usable photocathode area of the streak tube. The flat-field data set is obtained by using a slow streak ramp that may have a period from one millisecond (ms) to ten seconds (s), but may be nominally one second in duration. The system also provides a mapping of the geometric distortions, by spatially and temporarily modulating the output of the homogenizer and obtaining a data set using the slow streak ramps. All data sets are acquired using a CCD camera and stored on a computer, which is used to calculate all relevant corrections to the signal data sets. The signal and flat-field data sets are both corrected for geometric distortions prior to applying the flat-field correction. Absolute photometric calibration is obtained by measuring the output fluence of the homogenizer with a "standard-traceable" meter and relating that to the CCD pixel values for a self-corrected flat-field data set.

32 Claims, 9 Drawing Sheets

U.S. PATENT DOCUMENTS

| | | |
|---|---|---|
| 4,523,231 A | 6/1985 | Therrien |
| 4,542,290 A | 9/1985 | Tan et al. |
| 4,628,352 A | 12/1986 | Boue |
| 4,712,001 A | 12/1987 | d'Humieres et al. |
| 4,714,825 A | 12/1987 | Oba |
| 4,740,684 A | 4/1988 | Tsuchiya |
| 4,868,380 A | 9/1989 | Booman et al. |
| 4,945,224 A | 7/1990 | Koishi et al. |
| 5,043,568 A | 8/1991 | Tsuchiya et al. |
| 5,118,943 A | 6/1992 | Le Bars et al. |
| 5,142,193 A | 8/1992 | Chang et al. |
| 5,142,372 A | 8/1992 | Alfano et al. |
| 5,221,836 A | 6/1993 | Kinoshita |
| 5,268,741 A | 12/1993 | Chou et al. |
| 5,684,586 A | 11/1997 | Fortenberry et al. |
| 5,726,915 A | 3/1998 | Prager et al. |
| 5,894,539 A * | 4/1999 | Epstein ................. 362/26 |
| 6,095,673 A * | 8/2000 | Goto et al. ............ 362/307 |
| 6,238,076 B1 * | 5/2001 | Pascale et al. ......... 362/26 |
| 6,402,334 B1 * | 6/2002 | Yu-San ................. 362/26 |

OTHER PUBLICATIONS

Sweep Deflection Circuit Development Using Computer–Aided Circuit Design for the OMEGA Multichannel Streak Camera, LLE Review, vol. 73, pp. 6–19.–Date Not Provided.

* cited by examiner

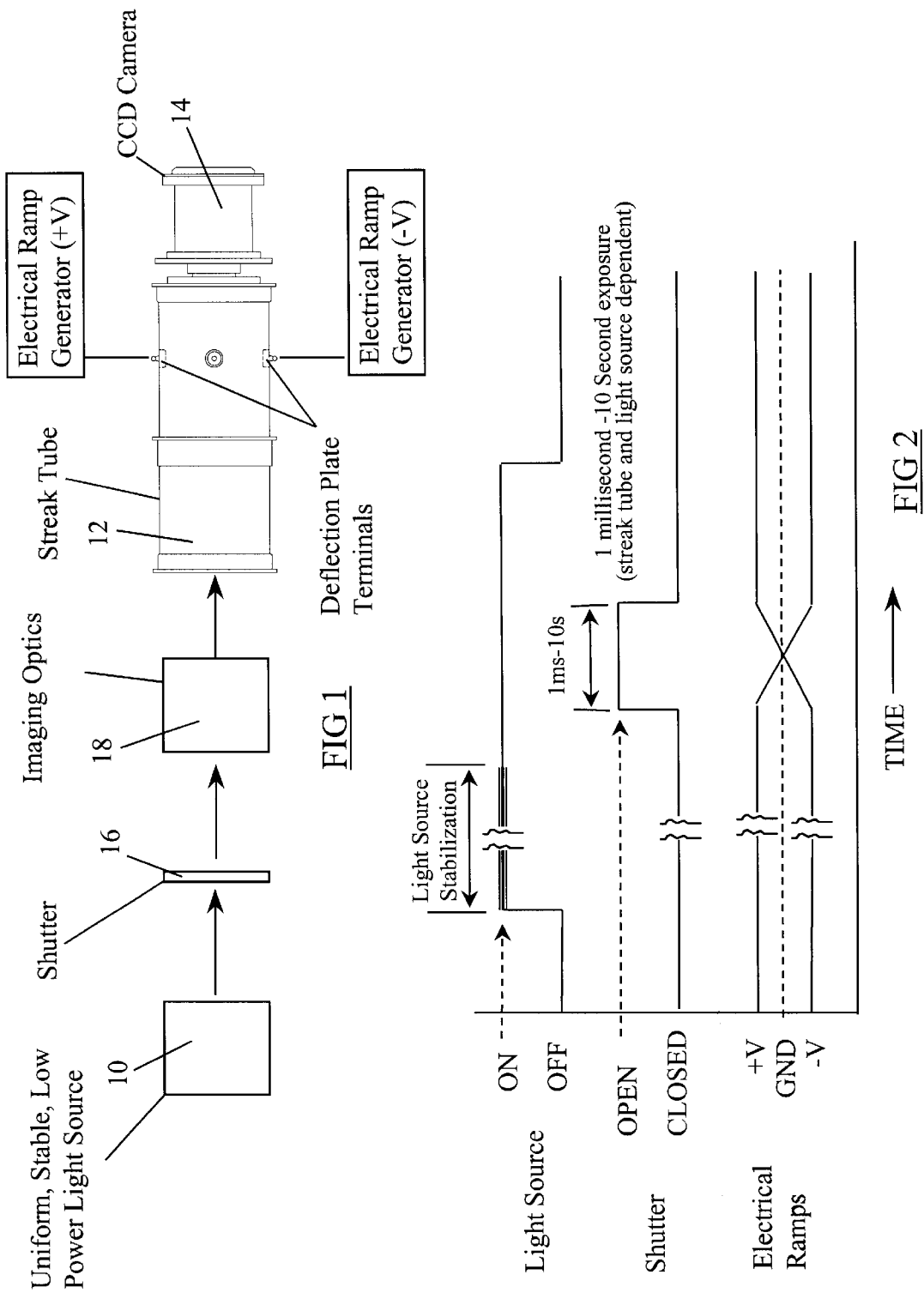

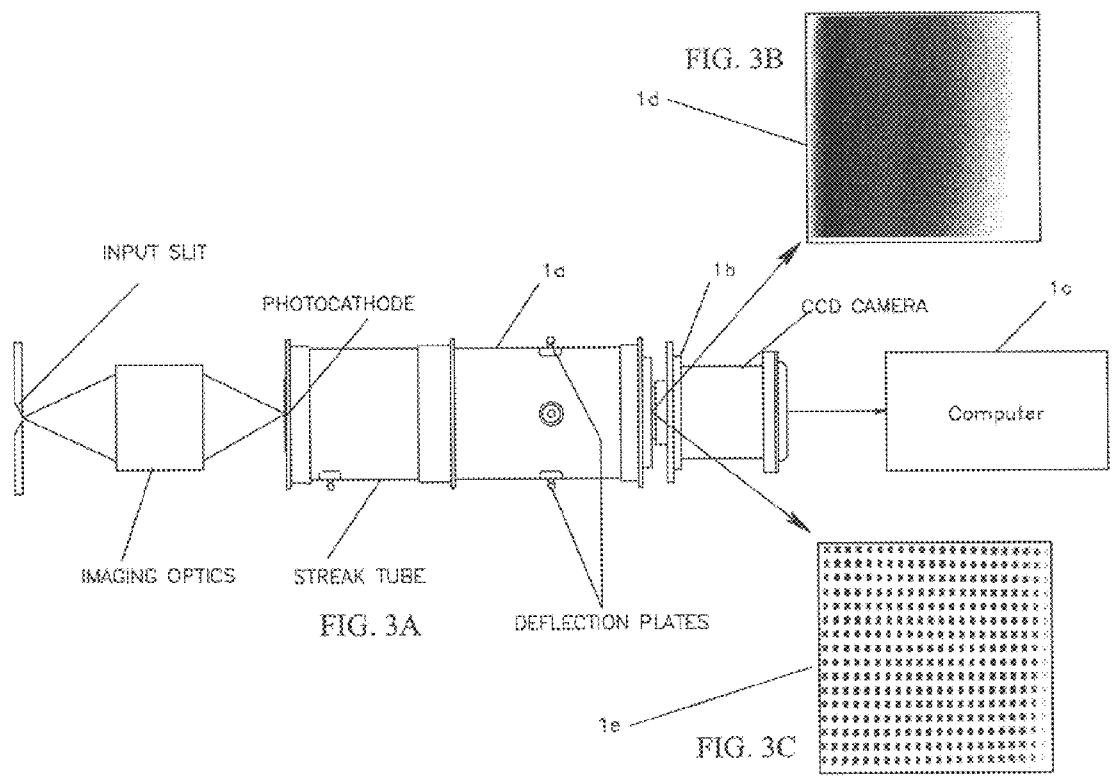

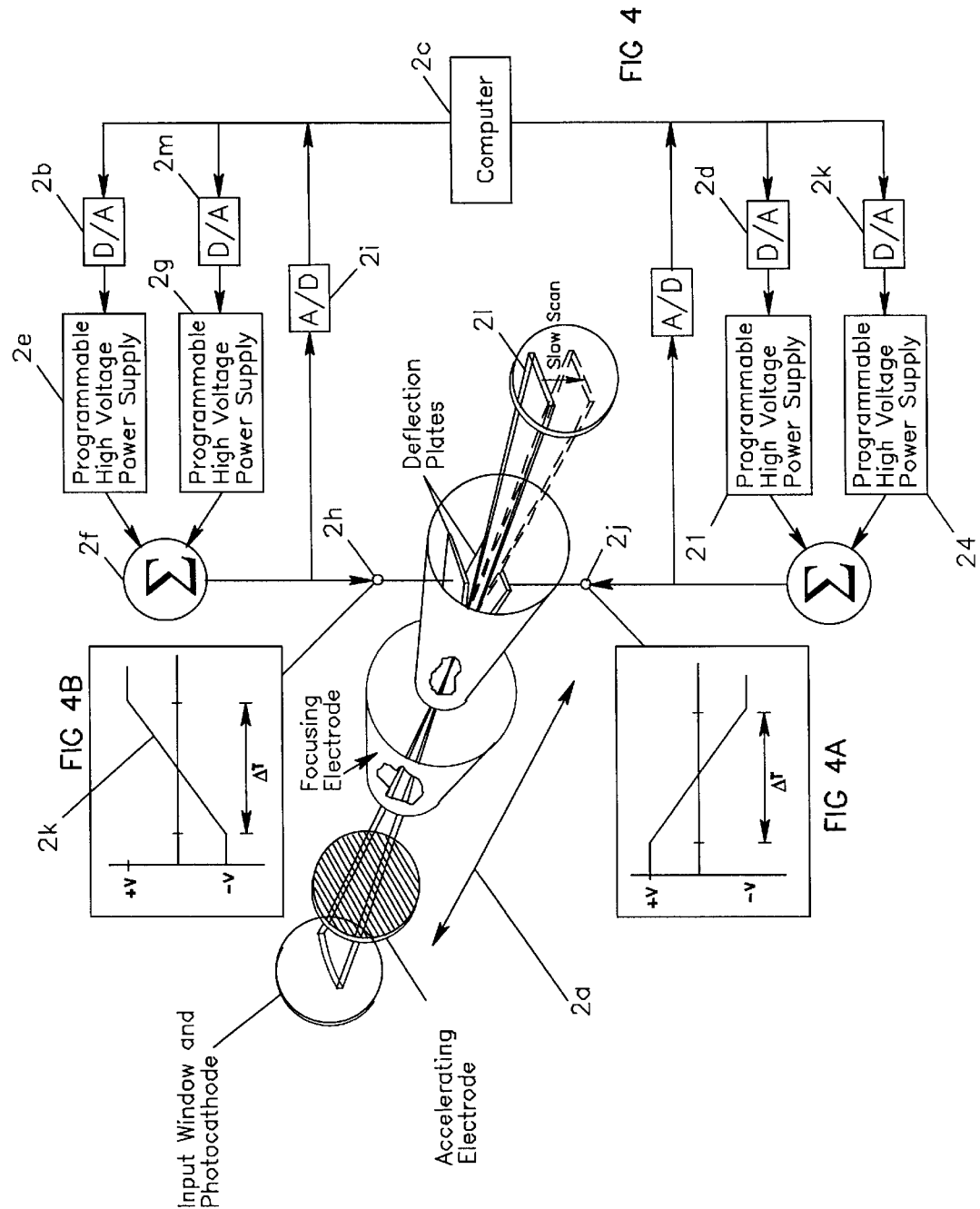

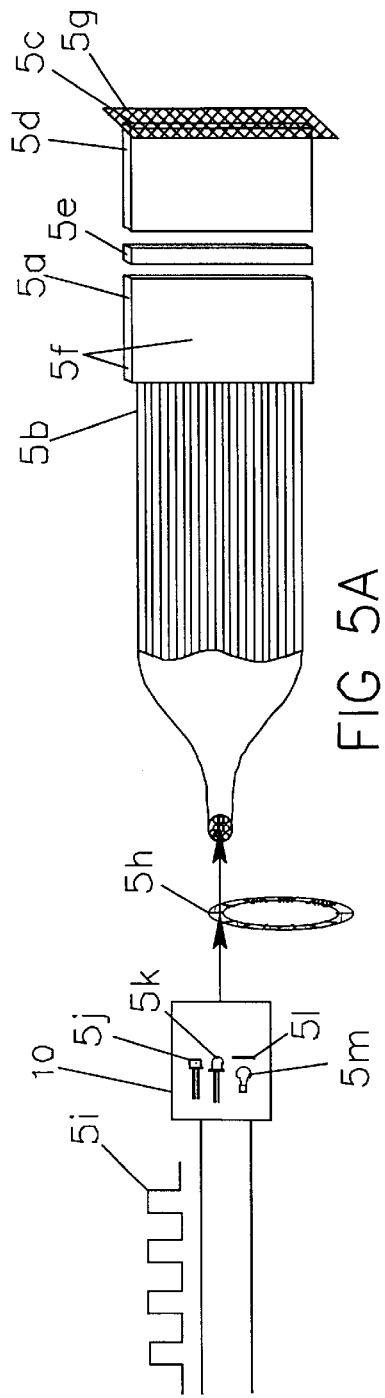
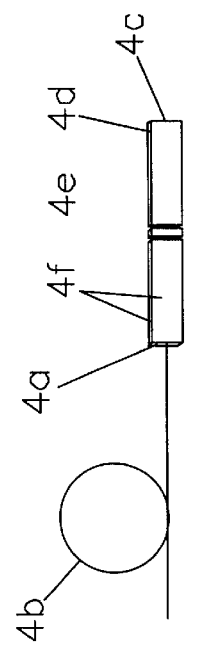
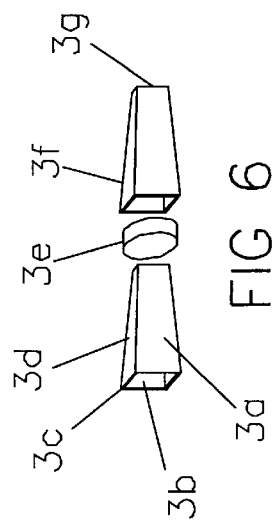
FIG 5A
FIG 5B
FIG 6

SYSTEM FOR PHOTOMETRIC CALIBRATION OF OPTOELECTRONIC IMAGING DEVICES ESPECIALLY STREAK CAMERAS

The U.S. Government has rights in this invention pursuant to Cooperative Agreement DE-FC03-92SF19460 between the Dept. of Energy and the University of Rochester

DESCRIPTION

The present invention relates to measurement of spatial variations in the sensitivity of an optoelectronic imaging device, such as a streak camera, to enable calibration and correction for such spatial variations. The system utilizes uniform illumination of the entrance of the device during measurements. The entrance may be an input aperture, such as a slit, and is referred to as an input slit hereinafter, without limitation to the entrance having another shape. Particularly the invention provides for measurement of the flat-field response representing the variations in sensitivity across an output image of the device and provides a flat-field data set as the system response pixel-by-pixel to a constant in time and spatially uniform illumination source. The illumination source may include light pipes which provide spacial homogenization of the illumination of the input slit during measurements and obtaining the flat-field data set. Geometric distortions can be mapped in accordance with the invention by imposing a spatial modulation using a grid over the output face of the homogenizer. A temporal modulation of the illumination source may also be used.

Streak cameras are useful to make quantitative measurements of transient phenomena lasting typically less than a microsecond. Such streak cameras are commercially available and are described in the literature both as regards their optoelectronics and their sweep deflection circuitry. See, LLE Review, Volume 73, pages 6–73 and Chang, et al., U.S. Pat. No. 5,142,193, issued Aug. 25, 1992; and Kinoshita, U.S. Pat. No. 5,221,836, issued Jun. 22, 1993. Images from streak cameras may be obtained using CCD cameras as their recording medium thereby enabling quantitative measurements of the phenomena to be made with higher precision and higher signal-to-noise ratios than previously was the case with film as the recording medium. In accordance with invention, the image obtained by a CCD camera and particularly a cooled, scientific grade CCD, provides for accurate photometric calibration of the streak camera and when calibrated, accurate measurements of the phenomena can be made with the streak camera.

Various proposals have been made for calibration of streak cameras. Most require the use of calibrating illumination of high intensity and submicrosecond duration. See an article entitled "Flat-field Response and Geometric Distortion Measurements of Optical Streak Cameras," by D. S. Montgomery et al. which appeared in SPIE, Vol. 832, High Speed Photography, Videography and Photonics V (1987, 283–288). Other proposal for calibration may be found in the following U.S. Patents, U.S. Pat. No. 4,628,352 issued to Boue, Dec. 9, 1986; Tsuchiya, et al., U.S. Pat. No. 5,043,568, Aug. 27, 1991; Koishi, et al., U.S. Pat. No. 4,945,224, Jul. 31, 1990; Oba, U.S. Pat. No. 4,714,825, Dec. 22, 1987; Schiller, et al., U.S. Pat. No. 4,435,727, Mar. 6, 1984; LeBars, et al., U.S. Pat. No. 5,118,943, Jun. 2, 1992; Arseneau, U.S. Pat. No. 4,323,977, Apr. 6, 1982; Stoub, et al., U.S. Pat. No. 4,298,944, Nov. 3, 1981; Malueg, U.S. Pat. No. 3,949,162, Apr. 6, 1976; Prager, et al. U.S. Pat. No. 5,726,915, Mar. 10, 1998; Therrien, U.S. Pat. No. 4,523,231, Jun. 11, 1985; Knoll, et al., U.S. Pat. No. 4,386,404, May 31, 1983; and Knoll, et al., U.S. Pat. No. 4,212,061, Jul. 8, 1980. The latter two patents disclose calibration of scintillation cameras which are examples of other optoelectronic imaging devices than streak cameras.

Proper calibration requires one to account for any localized differences in the recorded signal due to distortions, aberrations and defects in any of the streak camera components. To this end, one must measure very accurately the spatial variations in sensitivity across the output image, i.e., the flat-field response, and then perform a flat-field correction to the signal data set. The flat-field data set is the system response, pixel-by-pixel, to a constant in time and spatially uniform illumination source. The correction consists of dividing the signal data set by a normalized flat-field data set. Localized or small scale length variations in the system response could be due to photocathode or phosphor screen non-uniformities, differences in individual CCD pixel sensitivity, defects in the fiber optic window, etc. Long-scale length variations could be due to vignetting in the input optics or the electron optics, or to differences in the photocathode quantum efficiency along the input slit.

Calibrations must also include mapping any geometric distortions in the output image and correcting for them. Geometric distortions originating in the streak tube may be caused by the use of curved input or output surfaces, electron-optical spherical aberration or mechanical misalignment of the electrodes. Fiber optic components with twists or shears may also introduce geometric distortions. The calibrations discussed herein do not extend to establishing iso-temporal contours in the output image, or to corrections for nonlinear streak speeds. The techniques for calibrating streak speeds are well known.

Streak camera records in general have limited SNR due to the small number of photoelectrons per time and spatial resolution element that make up the signal. Excess current will introduce nonlinearities in the photoelectron beam that cannot be corrected. The photocurrent is restricted by space charge effects while the electrons are in transit from the photocathode to the screen and by charge depletion in the photocathode. In order to achieve the best SNR data, streak tubes are always operated close to their peak current handling capability. However, the system's flat-field response must be obtained with a SNR much greater than that of the signal data set so that the SNR of the corrected data set will not be significantly degraded. This is most important in those regions of the image where the sensitivity is poor to begin with. Since the SNR of a single flat-field data set can be no better than for a single signal data set, if they both are acquired with the same streak duration, multiple flat-field images must be collected and averaged to achieve the requisite SNR. This is regardless of the immense difficulty in producing a high brightness, constant amplitude light source with duration ranging from a few nanonseconds (ns) to a microsecond. Limited SNR also affects the precision with which the geometric distortions can be mapped and thereafter corrected.

In a streak camera that incorporates a fiber optically coupled, back-illuminated CCD camera (and no image intensifier), a streak tube photoelectron generates typically 25 CCD electrons. If the CCD pixel full well is 250,000 to 300,000 electrons, (typical of a 24 $\mu$m square pixel), the single pixel SNR is limited to about 100 by Poisson statistics. The regions of the image where the sensitivity is poor will have a lower SNR.

To record a flat-field image that has a SNR of 100 on a Megapixel CCD array requires that 1.6 nC of charge be extracted from the photocathode, ($10^4$ photoelectrons per pixel times $10^6$ pixels). The time duration for extracting this amount of charge is limited by the current handling capability of the streak tube, the charge stored in the capacitor formed by the photocathode and accelerator electrodes and the charge replenishment rate from the power supply. Preferably the electrode potentials should not change by more than 1% during the flat-field image acquisition time period to avoid affecting the focusing of the electron optics. The peak photocurrent delivered to the screen is typically less than 1.6 mA for commercially available streak tubes. This is calculated as 1% of the Child-Langmuir space charge limited current density at the photocathode times the usable photocathode area times the fraction of photoelectrons emitted from the photocathode that contribute to the signal at the screen. A simple division of the charge required by the peak current gives a minimum flat-field acquisition times of 1 $\mu s$. The total charge stored in the photocathode is typically less than 16 nC. Therefore, one would have to rely on charge replenishment from the power supply in order not to defocus the electron optics due to charge depletion at the photocathode, if extracted at the peak current rate. Typical streak tube power supplies draw about 100 $\mu A$ in the resistor divider circuits establishing the cathode and other electrode potentials. Therefore, only about 1 $\mu A$ is available for the photocurrent under continuous operation without defocusing the tube. This limits the single image flat-field acquisition time to greater than 1 ms. Brute force techniques such as adding external capacitors to the photocathode accelerator electrode gap, or utilizing higher current power supplies will aid in decreasing the flat-field acquisition time, but only to the extent that the charge replenishment rate to the region from which the charge is extracted is not limited by the photocathode resistivity.

It is the general object of the invention to provide a system for measuring in a single image the spatial variations in the sensitivity of the recorded output (the image) of a optoelectronic device, and especially for providing a signal for calibrating an optoelectronic imaging device such as a streak camera with an SNR greater than may be achieved in a single submicrosecond streak record.

Another object of the invention is to provide an improved system in which spatial sensitivity variations are acquired during a 1 ms to 10 second duration linear streak ramp in a streak camera thereby facilitating flat-field measurements and to measure the linearity of such ramps thereby insuring linearity thereof. A 1 second ramp is presently preferred.

It is a further object of the invention to provide improved optics especially adapted to be used to produce a spatially-uniform illumination source for flat-field measurements in streak cameras and otherwise.

It is a still further object of the invention to provide in a system for measuring spatial variations in the sensitivity of a streak camera or the recorded output of other optoelectronic imaging devices, and can have the means to measure geometric distortion in the image (the streak camera record).

A still further object of the present invention is to provide a system for measuring spatial variations in the response of an optoelectronic device, such as a streak camera, and acquiring a flat-field image for measuring the variation and obtaining a calibrating signal which bypasses the current and stored charged limitations discussed above by utilizing a slow sweep or streak ramp during acquisition of the flat-field image.

The present invention is based upon the discovery that spatial variations in sensitivity as represented by the flat-field image are independent of the rate that the image is acquired. In accordance with the invention, a slow scan (sweep) or streak ramp is used which may nominally be one second in duration while the device, particularly the photocathode of the streak camera being calibrated is illuminated with a constant uniform source field. The ramps may vary from one millisecond to ten seconds in duration. The maximum streak ramp duration is limited by the collection of dark current from either the streak tube photocathode or the camera (the CCD). High SNR is thereby obtained. SNR is maximized by choosing a ramp duration and light level so that the peak value of the recorded flat-field image approaches the CCD pixel full well. Better SNR may be obtained by acquiring and averaging multiple images.

The light source for flat-fielding streak cameras must be stable, emitting a constant fluence during the streak duration. Ideally, it must have the same spectrum as used for collecting the signal data set. LED's or laser diodes can be used for the source, as can a simple DC white light source with an appropriate color filter. The slow ramps permit the use of mechanical shutters to gate and/or modulate the light source. The high degree of spatial uniformity required for the flat-field measurements is achieved by using rectangular glass rods to spatially mix or homogenize the input light source. These glass rods have a reflective coating on their sides, and function as four mirror kaleidoscopes. The homogenizers may be either solid or hollow core light pipes. The light is fed into the homogenizer by an array of optical fibers, and typically makes several bounces before exiting as a spatially uniform source field. The rectangular cross section is matched to the photocathode area, typically 1–3 cm by less than 1 mm. Homogenizers may be stacked lengthwise with diffractive optic elements or diffusers in between them for additional smoothing of the spatial profile, especially when coherent light sources are used. The flat sides of the homogenizer ensure that they do not have any optical power that can produce virtual sources inside the homogenizer. However, the end facet of the homogenizer may be shaped to form a non-planar object plane for the streak camera.

Mapping the geometric distortions of the streak camera can be accomplished with the slow streak ramp technique by imposing a spatial and temporal modulation on the input source field. This produces a two dimensional array of bright areas in the output image that when corrected for the geometric distortion should form a linear grid pattern. It is not required that the spatial or the temporal modulations be periodic, although it does simplify the correction algorithm. A known spatial modulation is imposed on the input source field by placing a grid over the output fact of a homogenizer. The temporal modulation of the light source is produced electronically or by a mechanical chopper.

The foregoing and other objects, features, and advantages of the present invention will become more apparent from a reading of the following description in connection with the accompanying drawings in which:

FIG. 1 is a block diagram schematically showing the principal parts of a system embodying the invention;

FIG. 2 is a timing chart showing the timing of the operations of the system shown in FIG. 1;

FIG. 3A illustrates the streak camera (labeled streak tube) and calibration computer which is used to store the flat-field image;

Figure 7:
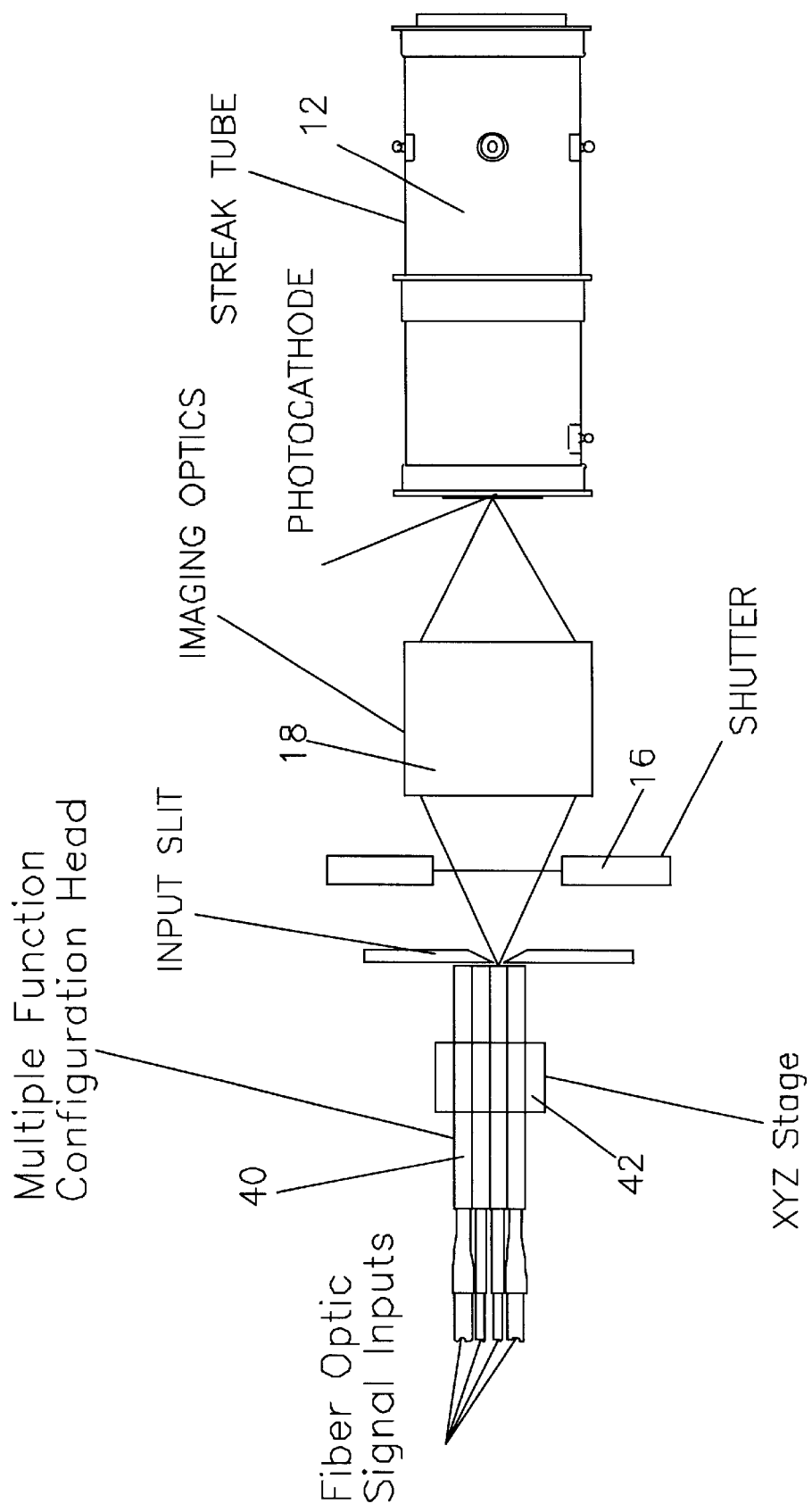
Figure 9:
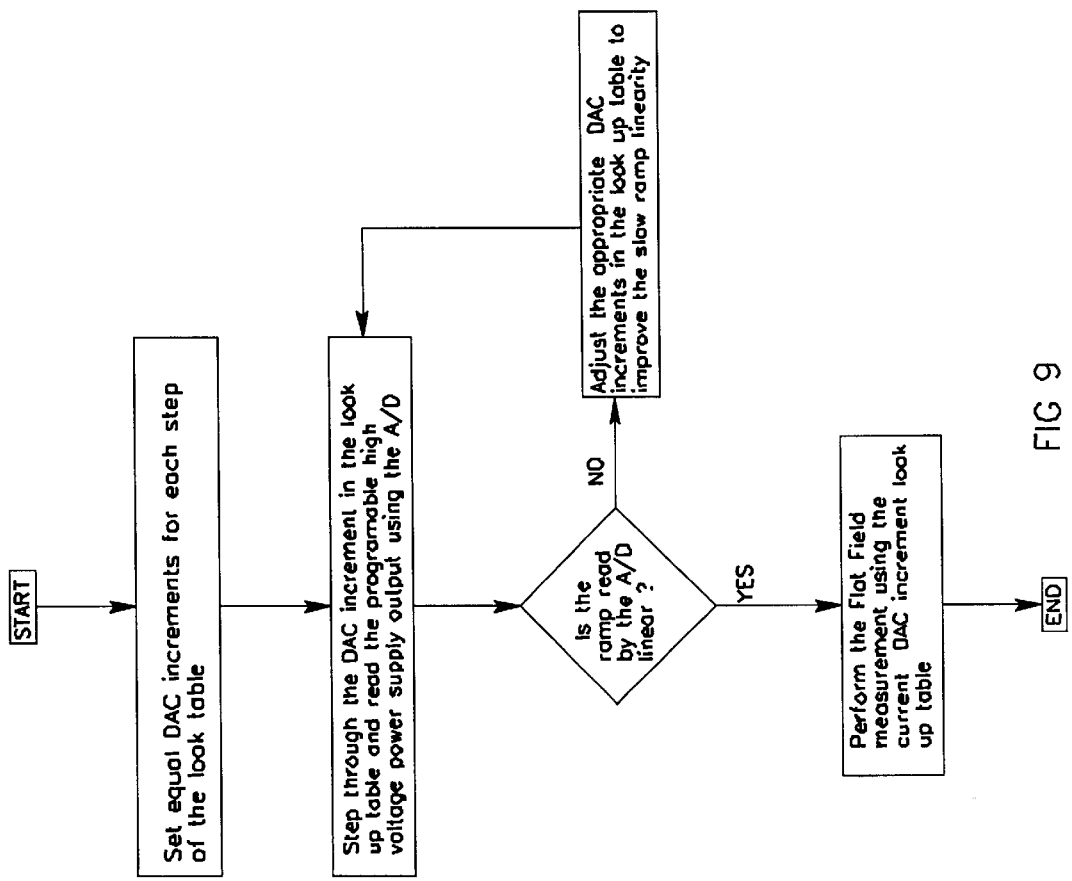
Figure 9A:
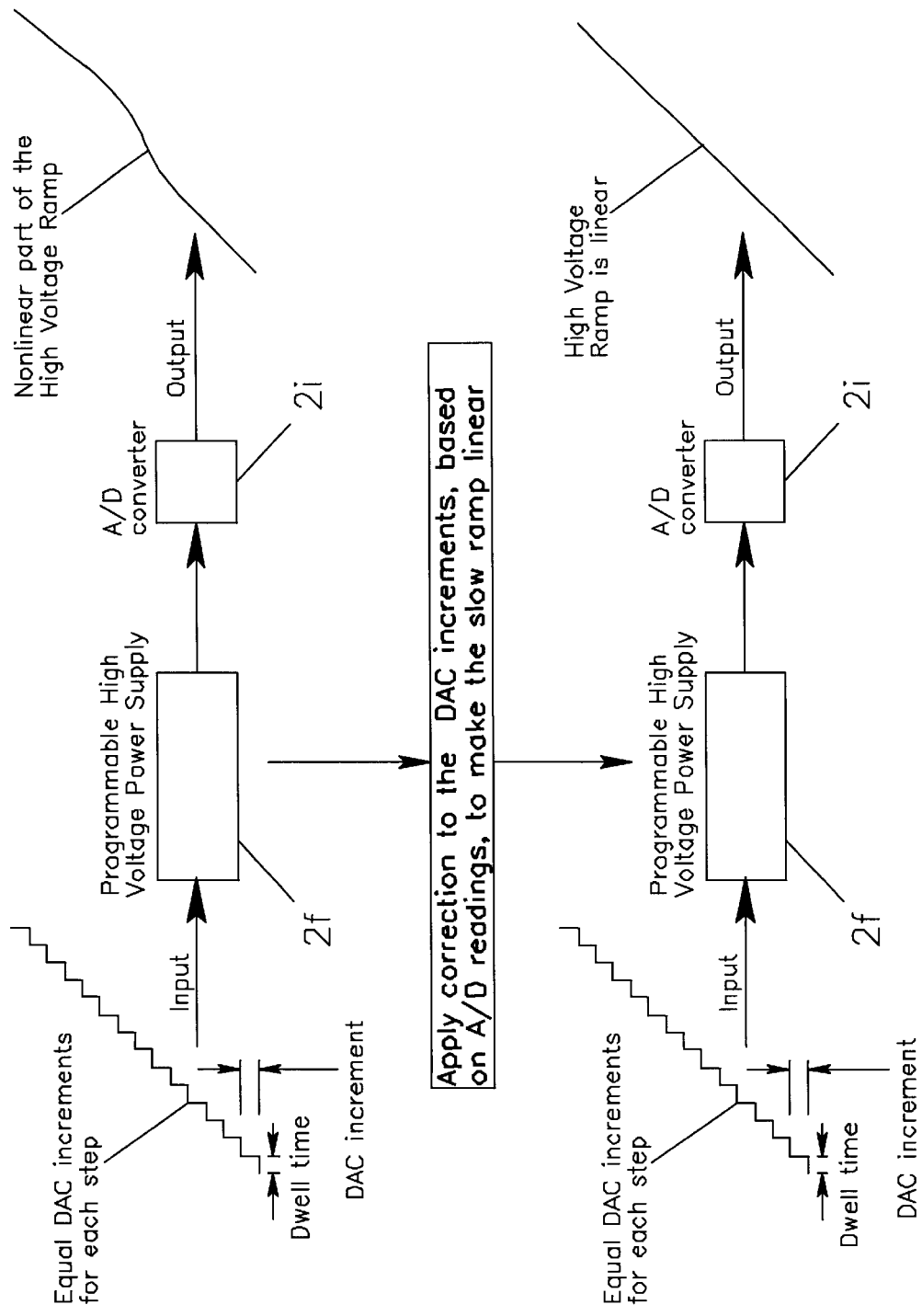

FIGS. 3B and C show respectively, a flat-field image and an image to measure the geometric distortion of the streak camera;

FIG. 4 is a schematic diagram of the streak tube and the system for generating the slow sweep or scan;

FIGS. 4A and B illustrate the ramp voltages used in producing the slow sweep or scan;

FIGS. 5A and B are schematic side and top views of the source of uniform illumination utilizing a flat slab homogenizer;

FIG. 6 is a schematic diagram illustrating tapered light pipes used in providing the homogenizer;

FIG. 7 schematically illustrates an optical head which is used for flat-field imaging in calibration of a streak camera in accordance with the invention and also data channel light pipe stacks and a grid covering the end of a light pipe homogenizer for obtaining measurements of geometric distortion by providing linear grid pattern through which the illumination reaches the photocathode of the streak camera;

FIGS. 8A and B are top and end views of the head shown in FIG. 7;

FIG. 9 is a flowchart of a program which may be installed in the computer shown in FIG. 4;

FIG. 9A is an illustration showing ramp linearization operations; and

Figure 10:
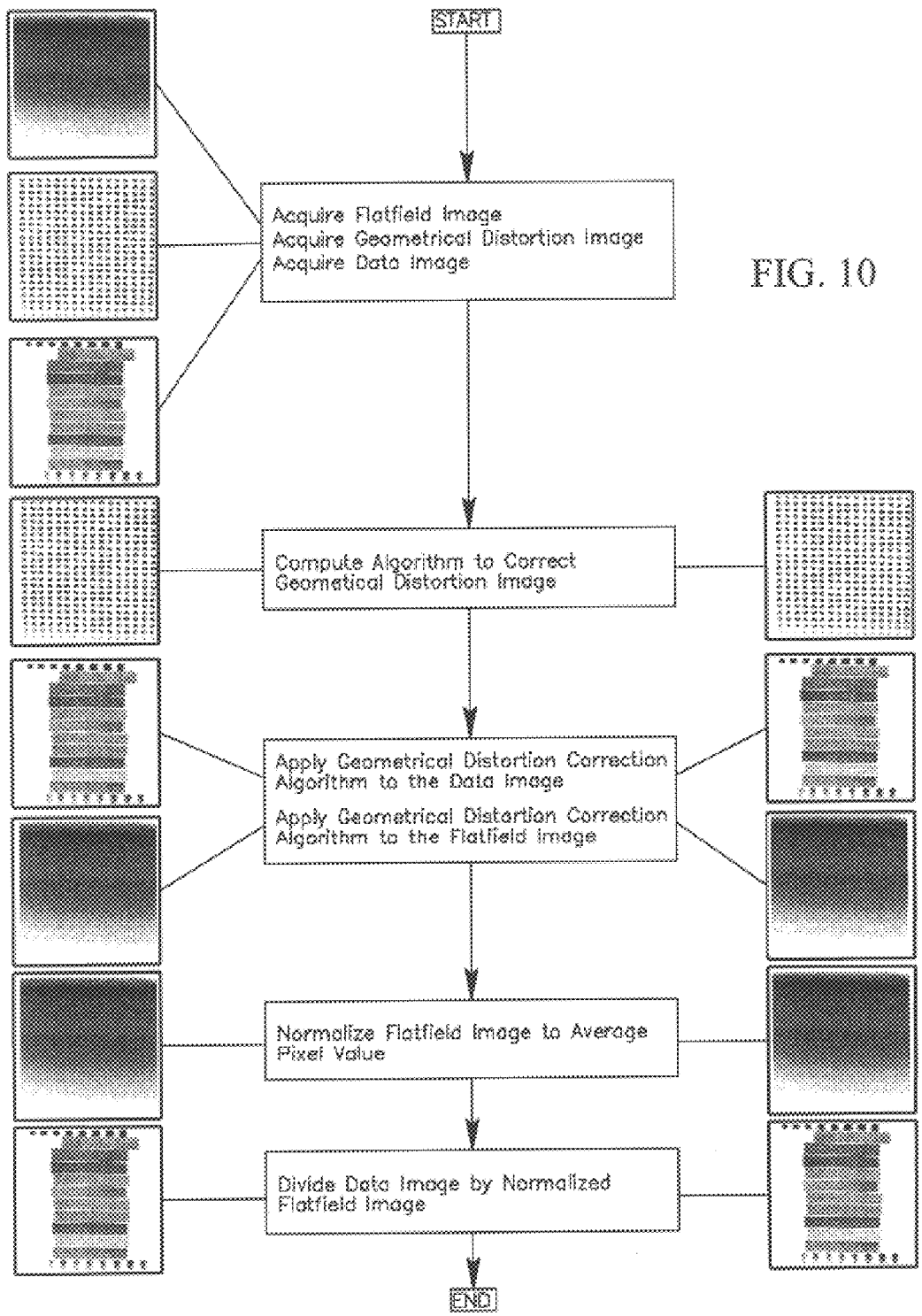

FIG. 10 is a flow chart of a program which may be installed in the computer shown in FIG. 3A for calibrating the streak camera system.

Referring to FIG. 1, there is shown a light source 10 which may include optical fibers for bringing light to a homogenizer, which presents a uniformly illuminated area from which flat-field images may be obtained in a streak camera. A CCD camera 14 to which the image is presented, abuts the output of the streak camera and is illuminated by the phosphor screen thereof. The streak camera to be calibrated is provided by imaging optics 18, streak tube 12 and CCD camera 14.

The source field is applied to the photocathode of the streak tube via a shutter 16, and the imaging optics 18 also shown in FIG. 7.

As shown in FIG. 2, the illumination is applied continuously during image acquisition, which occurs after the light source 10 has stabilized. A very long slow (1 ms to 10 s) sweep or ramp is used while the shutter is open. The sweep is generated by electrical ramps applied to the deflection plates or electrodes of the streak camera. These ramps are generated, preferably, using the circuitry illustrated in FIG. 4. In other words, the shutter 16 gates the illumination for a period equal to or slightly greater than the slow ramp duration. The CCD camera is preferably a cooled device which can readily integrate the signal over tens of seconds. The system's flat-field response is obtained with a SNR much greater than that of a signal data set so that the SNR of the corrected data will not be degraded significantly. The streak camera's SNR is limited by its electron current handling capability for short (less than 1 $\mu$s) exposure times, and by the charge stored in the photocathode for longer exposures (less than 1 ms). By utilizing the very long one ms to ten second sweep, the problems of obtaining a flat-field response with better SNR than the signal dataframe is overcome and the difficulties in producing a high brightness constant amplitude light source of submicrosecond duration as utilized in prior calibration proposals, is made unnecessary. The flat-field response is obtained with a single image rather than requiring averaging of hundreds of image frames. The calibration program in the computer (1c in FIG. 3A) is shown in FIG. 10.

As shown in FIG. 3A, the flat-field image from the streak tube (labeled 1a) and CCD camera (labeled 1b) is an output which is stored on the computer (labeled 1c). A typical flatfield image is shown in FIG. 3B. Geometric distortions can be mapped, also with a single exposure as illustrated by the image shown in FIG. 3C. This is accomplished by placing a grid over the output of the homogenizer to impose a known spatial modulation on the illumination source, and by electronically varying the source fluence to produce a modulation in the temporal direction.

Referring to FIG. 4, there is shown the internals of a streak camera or tube 2a. These internals are conventional and further information may be obtained in the above-referenced LLE review article. The slow scan produced by the circuitry, as illustrated by the ramps shown in FIGS. 4A and B, apply to the deflection plates of the streak camera and is generated under control of a computer 2c by power supplies 2g and 2l which generate the deflection voltages as shown in FIGS. 4B and A respectively. Both power supplies may be identical. They include a pair of 12 bit digital-to-analog converters (DAC) 2m and 2b driving a pair of programmable high voltage power supplies 2e and 2g. Specifically DAC 2m under computer 2c control, drives a programmable high voltage supply converter 2g to generate a positive going high voltage ramp shown at 2k in FIG. 4B. This ramp is summed with a negative bias voltage set by DAC 2b and delivered to one of the streak tube's deflection plates at input terminal 2h. The ramp is monitored with an analog-to-digital converter (AID or ADC) 2i whose output is fed back to the computer. The slow ramp is operated in closed loop mode directly or through a lookup table of dwell times stored in the computer which are invoked each step from the ADC 2i. The flow chart of FIG. 9 and the wave forms of FIG. 9A make the means for ramp linearization self-evident.

As noted above, the circuit 24 which generates and controls the ramp to the other deflection plate terminal 2j is similar. The programmable HV supply may be a DC/DC converter that provides an output voltage proportional to the input voltage. For one ms duration slow ramps requiring faster voltage slew rates, a 1000 v amplitude amplifier may be used. The feedback analog-to-digital converter 2i is used when the programmable supply output voltage characteristic is not sufficiently linear for high precision imaging. The ADC 2i is a high-speed analog-to-digital converter which monitors the change in voltage as a function of time and can generate a lookup table in the computer to set the dwell time at each level from the DAC 2m thereby linearizing the slow ramp. The light source 10 (FIG. 1) may alternatively be modulated, thereby providing a periodicity to the recorded signal for further monitoring of ramp linearity. A light source 10 suitable for use in the flat-field measurements is illustrated in FIGS. 5A and B and an alternative homogenizer which may be used in the source 10, is shown is FIG. 6. The input light source is generated by a laser diode 5j or LED 5k or a white light source 5m, the latter with an appropriate color filter 5l. The light source is operated in the DC mode for the flat-field calibration. Measurements of the linearity of the slow ramp and geometric distortions involves a modulation of the diode, LED or white light source fluence. This may be provided either electrically as shown at 5i or by means of a mechanical chopper 5h.

The light is delivered to a homogenizer 5a by a bundle of optical fibers shown at 5b. These fibers are also shown at 4b in FIG. 5B. The fibers are arrayed along the plane of the rectangular input 4a of the homogenizer and fill the aperture provided by the input end of the homogenizer 5a. The homogenizer, as shown in FIGS. 5A and B, may be light pipes in the form of glass bars 5f and 5d (also shown at 4f and 4d in FIG. 5B). Reflective coatings on the sides of the bars 5f and 5d contain and mix the light coupled into the input end of the homogenizer and produce a spatially-uniform field at the output indicated at 5c in FIGS. 5A and 4c in FIG. 5B. While a single bar may be used, it is preferable to use multiple bars such as 5d and 5f which may be coupled together with a diffuser 5e and 4e (the same element). Diffusion may be provided by a ground glass element, or in a controlled manner with a diffractive optic element. The diffuser further mixes the input light. In case of measurements of the geometric distortion, a grid 5g is placed over the output end of the homogenizer to spatially modulate the light delivered to the photocathode.

FIG. 6 shows that the homogenizers may be either solid or hollow core light pipes. The light pipes 3a and 3f in FIG. 6 are tapered inwardly in the same direction as the light is transmitted through the homogenizer. The larger and smaller ends of the pipes 3f and 3d which face each other may be connected to a diffuser 3e similar to the diffuser 5e but circular in shape and of a diameter equal or greater than the diameter of the larger facing end of the light pipe 3f. Together, the taper angle and the diffuser may be used to control the angular divergence of the illumination emitted from the homogenizer.

Figure 8:
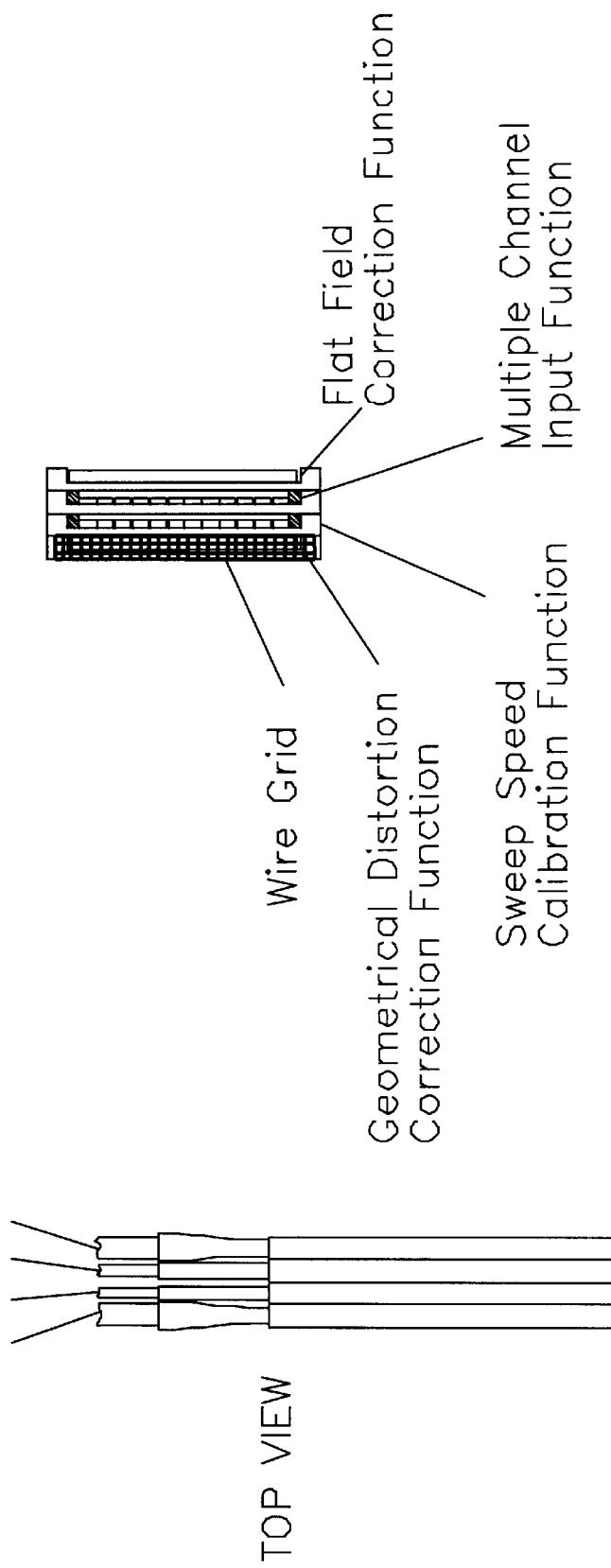

Referring to FIGS. 7 and 8, the input to the photocathode end of the streak camera 12 is shown with its associated imaging optics 18. The imaging optics provides illumination from one of the channels of a head 40. The head has four channels, one for flat-field measurement which presents the uniform illumination from the output end of the homogenizer. The head includes another homogenizer having its output end covered by a grid for geometric distortion measurements. The other channels may provide signal data or a series of light pipes for sweep speed calibration. All of the channels are fed by optical fibers. The head is mounted in a stage 42 which may be translated laterally with respect to the imaging optics so that light from a selected channel is incident on a flat mirror and is focused by concave and convex mirrors onto the photocathode. The focus may be adjusted by moving the stage towards and away from the imaging optics.

The flat-field data set stored in the computer 1c (FIG. 3A) may correct for the spatial variations and thereby calibrate the streak camera system by dividing the signal data set by the flat-field data set after normalization in the computer. The signal and flat-field data sets are both corrected for geometric distortions prior to applying the flat-field correction. A program for carrying out the calibration which may be installed in the computer is illustrated in FIG. 10.

It will be appreciated by those skilled in the art that the slow ramp flat-fielding technique and the mapping of the geometric distortions can be extended to streak tubes other than those with visible light sensitive photocathodes. For example, unsealed tubes with UV or x-ray sensitive photocathodes may also be calibrated by this method, given an appropriate input source. A gas discharge tube coupled to a hollow core homogenizer can provide a uniform UV light source. A DC electron beam bombarding an anode may be used as the x-ray source. The required uniformity of the x-ray source may be achieved (and limited) by the $R^2$ dependence of the fluence on the cathode to source distance.

The present invention may also be applied to streak cameras that incorporate image intensifiers and/or record on film. The slow ramp technique allows the fluence and flat-field acquisition time to be adjusted so that the image intensifier's current handling capability is not exceeded. The image registration problem for flat-field images recorded on film may preclude the correction of small scale non-uniformities, but long scale length variation in the sensitivity can certainly be corrected. Even though the SNR of film images will, in general, be less than for CCD images, the quantitative analysis of the data can benefit from the calibration techniques described herein.

What is claimed is:

1. A system for measuring, from a single image produced during a sweep in an optoelectronic imaging device, the spatial variation in the sensitivity of the device, which system comprises means for applying a spatially uniform and constant in time input source field to an input slit of said device for a period including the duration of said sweep, means for producing an output image during a sweep period exceeding 1 ms, and means for deriving a measurement representing said spatial variations during said sweep.

2. The system according to claim 1 wherein said sweep period is from about 1 ms to about 10 s.

3. The system according to claim 1 wherein said streak camera has deflection electrodes, and means for applying ramp voltages to said electrodes which have a period exceeding about 1 ms.

4. The system according to claim 1 further comprising means for imposing spatial modulation on said source field, including an illumination source providing said field and an optical element via which illumination from said source passes to said photocathode.

5. The system of claim 4 further comprising means for temporally modulating said field.

6. The system according to claim 1 wherein a source of constant illumination provides said source field, a pipe transmissive of said illumination having an input end and an output end over which said illumination is presented to an input area of said photocathode, said pipe having an exterior periphery which is reflective and being of sufficient length from said input to output ends to spatially mix and homogenize illumination incident on said input end which reaches said output end.

7. The system according to claim 6 wherein said pipe is a rectangular slab having rectangular input and output ends, said source of illumination includes a bundle of optical fibers arrayed in space relationship along the length dimension of said rectangular input end which launches said illumination into said input end, said reflective periphery being the sides of said pipe.

8. The system according to claim 7 wherein said pipe is constituted of a plurality of said pipes in tandem with ends facing each other.

9. The system according to claim 8 wherein a diffusing element is disposed between said facing ends.

10. The system according to claim 9 wherein said diffusing element is a diffractive optical element.

11. The system according to claim 7 wherein said pipe is solid or has a hollow core.

12. The system according to claim 9 wherein said pipes are tapered and have facing ends which are smaller and larger in area.

13. The system according to claim 12 wherein said pipes are rectangular, tapered tubes which taper in the direction of light transmission therein to said photocathode, larger and smaller ends of said tubes being the facing ends thereof.

14. The system according to claim 12 further comprising a diffuser at least equal in area to said larger facing end between said facing ends.

15. The system according to claim 6 wherein said illumination source is selected from the group consisting of an LED, a laser diode, and a color filtered incandescent white light lamp.

16. The system according to claim 6 further comprising a grid over said output end of said pipe for spatially modulating the illumination of said photocathode.

17. The system of claim 1 wherein said device is a streak camera.

18. A system for operating optoelectronic imaging devices having a photocathode and an image-forming element from which a signal data set is derived by a photodetector, said system comprising means for illuminating said photocathode uniformly and continuously during calibration operations, means for deriving as a calibrating signal a flat-field data set from said image-forming element during an interval which lasts a period exceeding about 1 ms, and means for combining said flat-field data set and said signal data set for calibrating said devices.

19. The system according to claim 18 wherein said period is from about 1 ms to about 10 s.

20. The system according to claim 18 wherein said deriving means comprises means for scanning said photocathode during said period.

21. The system according to claim 20 wherein said sweeping means comprises electron beam deflection electrodes, and means for applying linear ramp voltages to said electrodes of duration equaling said period.

22. The system of claim 18 wherein said image forming element is a phosphor screen and said photodetector is provided by a CCD camera.

23. A source of constant illumination comprising a light source, a pipe transmissive of said illumination having an input end and an output end, over which said illumination presented by said light source, is uniformly distributed over said output end, said pipe having an exterior periphery which is reflective and being of sufficient length from said input to output ends to spatially mix and homogenize illumination incident on said input end which reaches said output end, and wherein said pipe is a rectangular slab having rectangular input and output ends, said source of illumination includes a bundle of optical fibers arrayed in space relationship along the length dimension of said rectangular input end which launches said illumination into said input end, said reflective periphery being the sides of said pipe.

24. The source according to claim 23 wherein said pipe is constituted of a plurality of said pipes in tandem with ends facing each other.

25. The source according to claim 24 wherein a diffusing element is disposed between said facing ends.

26. The source according to claim 25 wherein said diffusing element is a diffractive optical element.

27. The source according to claim 23 wherein said pipe is solid or has a hollow core.

28. The source according to claim 23 wherein said pipes are tapered and have facing ends which are smaller and larger in area.

29. The source according to claim 28 wherein said pipes are rectangular, tapered tubes which taper in the direction of light transmission therein to said photocathode, larger and smaller ends of said tubes being the facing ends thereof.

30. The source in accordance with claim 29 further comprising a diffuser at least equal in area to said larger facing end between said facing ends.

31. A source of constant illumination comprising a light source, a pipe transmissive of said illumination having an input end and an output end, over which said illumination presented by said light source, is uniformly distributed over said output end, said pipe having an exterior periphery which is reflective and being of sufficient length from said input to output ends to spatially mix and homogenize illumination incident on said input end which reaches said output end, and further comprising a grid over said output end of said pipe for spatially modulating the illumination from said output end.

32. A system for mapping geometric distortion in an optoelectronic imaging device having a photocathode and an image-forming element from which a signal data set is derived by a photodetector, said system comprising means for illuminating said photocathode with spatially and temporally modulated illumination during mapping operations, means for deriving as a mapping signal a geometric correction data set from said image-forming element during an interval which lasts a period exceeding about 1 ms, and means for combining said geometric correction data set and said signal data set for calibrating said devices.

* * * * *